United States Patent [19]

Anderson

[11] 4,393,320
[45] Jul. 12, 1983

[54] PERMANENT MAGNET ROTOR

[75] Inventor: Gordon K. Anderson, Tustin, Calif.

[73] Assignee: Carrier Corporation, Syracuse, N.Y.

[21] Appl. No.: 298,703

[22] Filed: Sep. 2, 1981

[51] Int. Cl.³ .......................................... H02K 21/12
[52] U.S. Cl. .................................... 310/156; 310/217
[58] Field of Search .............. 310/152, 153, 156, 197, 310/261, 262, 264, 265, 267, 268, 105, 42, 43, 216, 218, 183, 211, 210, 217, 193

[56] References Cited

U.S. PATENT DOCUMENTS

| | | | |
|---|---|---|---|
| 2,461,566 | 2/1949 | Morrill | 310/261 U X |
| 2,485,474 | 10/1949 | Brainard | 310/156 |
| 2,504,823 | 4/1950 | George | 310/42 |
| 2,637,825 | 5/1953 | Moore | 310/156 |
| 2,739,253 | 1/1956 | Plumb | 310/156 |
| 3,169,203 | 2/1965 | Lavin et al. | 310/156 |
| 3,612,925 | 10/1971 | Swanke | 310/42 |
| 3,671,789 | 6/1972 | Menzies | 310/179 |
| 3,832,583 | 2/1974 | Chang | 310/201 |
| 4,126,933 | 11/1978 | Anderson et al. | 29/598 |
| 4,143,457 | 3/1979 | McGahern | 29/598 |
| 4,250,424 | 2/1981 | Sento et al. | 310/261 |
| 4,302,693 | 11/1981 | Burgmeier et al. | 310/156 |

*Primary Examiner*—R. Skudy
*Attorney, Agent, or Firm*—Donald F. Daley; David J. Zobkiw

[57] ABSTRACT

A permanent magnet rotor comprising a housing defining a central rotor axis, an inner ring secured within the housing and annularly extending around the rotor axis, a plurality of permanent magnets supported within the housing and annularly spaced around the inner ring, and an outer ring secured within the housing, annularly extending around the permanent magnets, and including a plurality of outer ring segments. The rotor further comprises filler material filling spaces between adjacent permanent magnets and adjacent outer ring segments; and a plurality of damper plates located radially outside the filler material, engaging the housing, and engaging and extending between adjacent outer ring segments.

3 Claims, 3 Drawing Figures

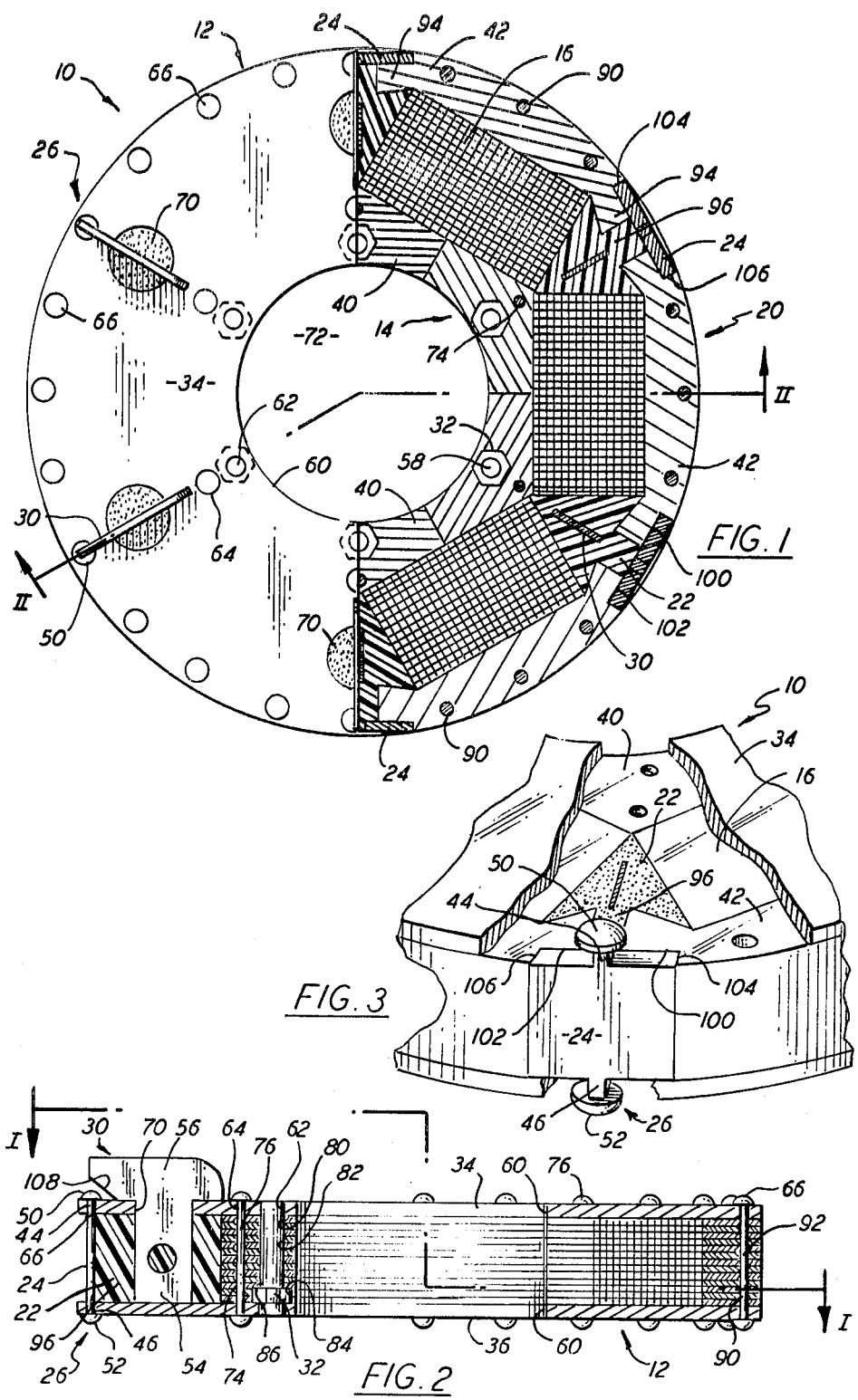

PERMANENT MAGNET ROTOR

BACKGROUND OF THE INVENTION

This invention generally relates to rotors having permanent magnets, and more particularly to rotors of this type which also employ an epoxy resin to fill various internal voids and interstices.

Permanent magnet rotors are frequently used in electric generators to produce an electric current without the need for brushes or other rotating electrical connectors. These generators, for example, are often employed with transport refrigeration machines to deliver an electric current suitable for operating fan or blower motors of the refrigeration machine.

Generally, a permanent magnet rotor includes a housing, a plurality of permanent magnets, an inner ring, and an outer ring. The housing conventionally comprises a pair of substantially identical, circular plates. These plates are parallel, spaced apart, and have aligned central openings defining a shaft opening. The permanent magnets are placed or sandwiched between the housing plates; and the magnets are annularly spaced around the shaft opening, radially between and spaced from both the shaft opening and the outside circumference of the housing plates. The inner and outer rings of the rotor are secured within the housing, between the housing plates; and these rings are respectively located radially inside and outside the permanent magnets, holding the magnets against radial movement.

Typically, the permanent magnets, the inner ring, and the outer ring do not completely fill the space between the plates of the housing, leaving several voids or pockets therein. For many years, these internal spaces were filled with aluminum. Several years ago, I made a major improvement upon the then conventional design of rotors of the general type described above by, among other things, providing a method where the internal cavities and voids of the rotors may be filled with an inexpensive epoxy resin. This improvement is described in detail in my United States patent 4,126,933. While this improvement substantially reduced the cost of the rotors, there was some accompanying reduction in the capacity of the rotors, and over the past several years I have studied these improved rotors to see if their capacity could be increased.

SUMMARY OF THE INVENTION

An object of the present invention is to increase the capacity of permanent magnet rotors of the type employing an epoxy resin to fill internal cavities.

Another object of this invention is to provide a permanent magnet rotor with damper plates connecting adjacent, spaced apart segments of an outer ring of the rotor.

A further object of the present invention is to provide a permanent magnet rotor of the type employing an epoxy material to fill internal cavities with, compared to conventional prior art rotors of this type, is stronger and simpler to construct.

These and other objects are attained with a permanent magnet rotor comprising an electrically conductive, non-magnetic housing defining a central, rotor axis, an inner ring secured within the housing and annularly extending around the rotor axis, a plurality of permanent magnets supported within the housing and annularly spaced around the inner ring, and an outer ring secured within the housing, annularly extending around the permanent magnets, and including a plurality of outer ring segments. The housing, the permanent magnets, and the outer ring segments define a plurality of pockets, and electrically non-conductive filler material is provided for filling those pockets. The rotor further comprises a plurality of electrically conductive, non-magnetic damper plates located radially outside the filler material, engaging the housing, and engaging and extending between adjacent outer ring segments. Means are provided for securing the damper plates within the rotor.

A BRIEF DESCRIPTION OF THE DRAWINGS

FIG. 1 is a front view, partially in cross section, of a permanent magnet rotor constructed in accordance with a preferred embodiment of the present invention;

FIG. 2 is a side, cross sectional view of the permanent magnet rotor, taken along line II—II of FIG. 1; and FIG. 3 is a perspective view of an outer portion of the permanent magnet rotor, showing a damper plate thereof in greater detail.

DESCRIPTION OF THE PREFERRED EMBODIMENT

Particularly referring to FIGS. 1 and 2, there is illustrated a preferred embodiment of permanent magnet rotor 10 of the present invention. Generally, rotor 10 includes housing 12, inner ring 14, a plurality of permanent magnets 16, and outer ring 20. Rotor 10 further comprises filler material 22, a plurality of damper plates 24, and means 26 securing the damper plates within the rotor. Preferably, rotor 10 also includes a plurality of rotor fans 30 and a plurality of jam nuts 32. More specifically, housing 12 includes circular front and back plates 34 and 36. Inner ring 14 includes a plurality of separate, annular segments 40, outer ring 20 similarly includes a plurality of separate, annular segments 42, and each inner and outer ring segment comprises a stack of laminated metal sheets or plates. Filler material 22 preferably comprises a cured epoxy resin. Securing means 26 preferably includes a plurality of front and back rivets 44 and 46, with these rivets having head portions 50 and 52 respectively. Rotor fans 30 comprise bases 54 and blades 56, and jam nuts 32 define a plurality of internally threaded openings 58.

Referring to housing 12 in greater detail, front and back plates 34 and 36 are substantially identical and are formed from a non-magnetic, electrically conductive material such as aluminum. Each plate 34 and 36 defines a central, circular opening 60 and a plurality of rod or bolt openings 62, inner rivet openings 64, outer rivet openings 66, and resin openings 70. Openings 62, 64, 66 and 70 are preferably equally spaced along first, second, third, and fourth circles, respectively, around central openings 60. Openings 62 and 64 are defined by radially inner portions of plates 34 and 36, with openings 62 located adjacent to central opening 60 and rivet openings 64 located radially outside the openings 62. Openings 66 are located near the outside circumference of plates 34 and 36, and resin opening 70 are defined by radially intermediate portions of the housing plates, between openings 64 and 66. In assembly, plates 34 and 36 are parallel and spaced apart, with the openings 60, 62, 64, 66 and 70 of plate 34 aligned with the corresponding openings 60, 62, 64, 66 and 70 of plate 36. When so assembled, openings 60 of plates 34 and 36 cooperate to define central, shaft opening 72, with the longitudinal axis of this opening defining the axis of rotor 10.

Inner ring 14 is secured within housing 12 and annularly extends around the rotor axis. In particular, inner ring segments 40 are located or sandwiched between housing plates 34 and 36, immediately outside shaft opening 72. Each inner ring segment 40 defines an axial rivet opening 74 aligned with an inner rivet opening 64 of each plate 34 and 36, and rivets 76 axially extends through aligned openings 64 and 74, securely holding inner ring segments 40 in place. Preferably, the inside, annular surfaces of inner ring segments 40 are coterminous with shaft opening 72, and adjacent inner ring segments are contiguous, forming a continuous ring around the shaft opening.

In addition, with particular reference to FIG. 2, preferably inner rings 14 define a plurality of axial through bores 80 aligned with bolt openings 62 of housing plates 34 and 36, with jam nuts 32 embedded within these through bores. Through bores 80 preferably comprise first cylindrical portions or openings 82 extending rearward from front plate 34, and second hexagonal portions or openings 84 extending rearward from openings 82 to back plate 36. Openings 82 and 84 are substantially coaxial, with the latter openings having a slightly larger diameter than the former openings, forming shoulders 86 at the forward end of openings 84. Jam nuts 32 are located within openings 84, pressed between back plate 36 and shoulders 86. Jam nuts 32, as discussed in greater detail below, assist removing rotor 10 from a drive shaft.

Particularly referring now to FIG. 1, permanent magnets 16 are supported within housing 12 and are annularly spaced around inner ring 14, preferably equally spaced therearound. Also, preferably each magnet 16 has a rectangular cross section, inner ring segments 40 cooperate to define a plurality of planar, outside annular surfaces, and the permanent magnets are contiguous to and radially extend outward from these planar surfaces.

Outer ring 20 is secured within housing 12 and annularly extends around permanent magnets 16. Outer ring segments 42 are slightly spaced apart from each other, though, resulting in a broken or discontinuous ring around magnets 16. More specifically, outer ring segments 42 are positioned or sandwiched between housing plates 34 and 36, immediately radially outside permanent magnets 16. Each outer ring segment 42 defines a plurality of axial bores 90 aligned with outer opening 66 of plates 34 and 36, and rivets 92 axially extend through aligned openings 66 and bores 90, securely fixing the outer ring segments in place.

Preferably, each outer ring segment 42 defines a planer, radially inside surface contiguous to and substantially coextensive with the radially outside, planer surface of a permanent magnet 16; and the outer ring segments radially extend outward from the permanent magnets and define arcuate, outside annular surfaces substantially coterminous with the outside circumference of plates 34 and 36. Outer ring segments 42 annularly extend slightly beyond the ends of magnets 16, however, and include radially flared inward portions 94, which help secure or hold the permanent magnets against annular movement during assembly and operation of rotor 10.

With the above described arrangement, housing 12, inner ring 14, permanent magnets 16, and outer ring 20 do not completely fill the interior or rotor 10 outside shaft opening 72, leaving or defining a plurality of pockets 96 within the rotor, and these pockets are filled with electrically non-conductive filler material 22. Specifically, annular spaces are provided between adjacent permanent magnets 16, and between adjacent outer ring segments 42, with each of the latter spaces being radially outside and in communication with one of the former spaces. As referred to earlier, for many years these internal cavities and spaces of rotor 10 were filled with aluminum, and several years ago I made an advancement in the state of the art by providing a method where, among other things, pockets 96 may be filled with an inexpensive, resinous material, which may be poured into the pockets via resin openings 70 of front plate 34. While this new method substantially reduced the cost of the rotors, there was some accompanying reduction in rotor capacity. In accordance with the present invention, I have learned that the capacity of rotor 10 may be increased by providing the rotor with damper plates 24, in combination with the non-magnetic, electrically conductive housing plates 34 and 36.

Discussing damper plates 24 in greater detail, the damper plates, like housing plates 34 and 36, are formed from a non-magnetic, electrically conductive material such as aluminum. Damper plates 24 are located radially outside filler material 22, engage housing 12, and engage and annularly extend between adjacent outer ring segments 42. It is believed that damper plates 24, in combination with front and back housing plates 34 and 36, increase the capacity of rotor 10 by providing an electrically conductive flow path, laterally around each magnet 16, for eddy currents generated during operation of the rotor.

With the preferred embodiment of rotor 10 illustrated in the drawing, outer ring segments 42 define small recesses receiving damper plates 24, wherein the damper plates are located within housing 12 and structurally reinforce the outer ring segments against both radial and annular forces. More specifically, with particular reference to FIGS. 1 and 3, each outer ring segment 42 defines first and second annular shoulders 100 and 102 and first and second radial shoulders 104 and 106. The annular shoulders 100 and 102 of each outer ring segment 42 are radially spaced inward from the outside annular surface thereof and are respectively located at first and second annular ends of the ring segment. The radial shoulders 104 and 106 of each outer ring segment 42 respectively extend radially outward from the first and second annular shoulders 100 and 102 of the ring segment.

Damper plates 24 are located radially outside, are contiguous to, and annularly extend across first and second annular shoulders 100 and 102 of adjacent outer ring segments 42, securing the outer ring segments against radial forces; and the damper plates annularly extend adjacent, and preferably are in contact with, radial shoulders 104 and 106 of adjacent outer ring segments, holding the outer ring segments against annular forces. With this specific arrangement, damper plates 24 not only improve the capacity and the structural integrity of rotor 10, but the damper plates also facilitate aligning the individual laminated metal sheets forming outer ring segments 42 during assembly of rotor 10.

Securing means 26 secure damper plates 24 within rotor 10, and preferably, as mentioned above, this securing means includes front and back damper plate rivets 44 and 46, with front rivets 44 having head portions 50 and the back rivets 46 having head portions 52. Each front damper plate rivet 44 extends forward from a damper plate 24, through front plate 34, specifically in outer opening 66 thereof, and head portion 50 of the rivet overlays a portion of the front surface of plate 34. Analagously, each back damper plate rivet 46 extends rearward from a damper plate 24, through back plate 36, specifically an outer opening 66 thereof, and head portion 52 of the rivet overlays a portion of the back surface of plate 36. In this manner, as will be apparent, damper plates 24 are securely held in position between housing plates 34 and 36. Moreover, as shown in the drawing, preferaby front and back damper plate rivets 44 and 46 are integral with damper plates 24.

As will be understood by those skilled in the art, in operation rotor 10 is secured to a rotatable drive shaft and rotates within a stator of an electric generator to produce an electric current. During this operation, the stator may generate a significant amount of heat; and rotor 10 is provided with rotor fans 30 to circulate air over the stator as the rotor rotates, cooling the stator. Rotor bases 54 extend through resin openings 70 of front plates 34 and are embedded in the filler material 22 therebehind. Rotor blades 56 have a generally square, planer shape and are secured to rotor bases 54, and blades 56 may be integral therewith. Blades 56 are located forward of front plate 34 and are substantially perpendicular thereto. Blades 56 extend along radii of front housing plate 34, toward the outside circumference of the front plate. Preferably, a portion of each blade 56 adjacent the outside circumference of front plate 34 defines recess 108 receiving a front rivet head 50. Recesses 108, thus, allow blades 56 to extend over or past front damper plate rivets 44 without interfering with the rivets.

As briefly mentioned earlier, in operation rotor 10 is secured to a rotatable drive shaft, and jam nuts 32 assist removing the rotor from the shaft. In particular, rotor 10 is mounted on a rotatable shaft, with the shaft extending through shaft opening 72; and the rotor is placed against a radial flange or hub of the drive shaft and then secured to this flange, for example by inserting a plurality of bolts through selected aligned openings 62 and 80 of the rotor and into mating engagement with complementary holes defined by the shaft flange.

To remove rotor 10 from the drive shaft, generally, the bolts securing the rotor to the shaft flange are removed and then the rotor is pulled or pushed away from the shaft flange and off the drive shaft. Specifically, to move rotor 10 away from the shaft flange, a plurality of threaded bolts, symmetrically spaced around the power shaft, are threaded through jam nuts 32 and into abutting contact with the shaft flange. Further rotation of the threaded bolts pushes jam nuts 32, back plate 36, and thus the entire rotor 10 away from shaft flange. Because these threaded bolts are symmetrically spaced around the power shaft, the bolts may be easily employed to apply symmetric pushing forces to rotor 10, smoothly pushing the rotor along the power shaft and preventing the rotor from binding thereagainst.

To assemble rotor 10, front plate 34 is placed on a retainer disc having upwardly extending projections, with these projections extending through a plurality of openings 64 and 66 of the front plate. Laminations forming inner and outer rings 14 and 20 are then mounted on front plate 34. A sufficient number of laminations are provided so that the height of inner and outer rings 14 and 20 approximate the height of permanent magnets 16. After these laminations are in place, magnets 16 are positioned between the inner and outer rings 14 and 20. Next, jam nuts 32 are positioned within through bores 80; and damper plates 24, with heads 50 and 52 of front and back rivets 44 and 46 being unflared or blank, are positioned between adjacent outer ring segments 42, and with front rivets 44 extending through outer openings 66 of front plate 34.

Back plate 36 is then placed over the partial assembly, with holes 64 and 66 of the front and back plates aligned. The partial assembly is then raised from the retainer disc, and rivets 76 and 92 are inserted into the assembly, the rivets at this point having one formed or flared end and one blank or unflared end. The blank end of rivets 76 and 92 are then flared, firmly securing plates 34 and 36 together, and firmly securing inner ring 14, magnets 16, and outer ring 20 between the housing plates. Damper plate rivet heads 50 and 52 are also flared over front and back plates 34 and 36, locking damper plate 24 in position.

With damper plates 24 secured in position, the next step in the assembly of rotor 10 is to pour a suitable nonmetallic, molten material such as a liquid epoxy resin through resin openings 70 to fill internal pockets 96 of the rotor. During this step, damper plates 24 act as circumferential barriers or seals for epoxy material 22, eliminating the necessity to add a temporary circumerential fixture while pouring the liquid epoxy into the interior cavities of rotor 10. Preferably, rotor fans 30 are inserted into pockets 96 behind recess openings 70 either prior to or shortly after filling the pockets with the liquid epoxy so that the rotor fans are bonded within rotor 10 as the epoxy hardens. After epoxy 22 is poured into rotor 10, the assembly is allowed to stand at room temperature for approximately one hour. Nominal cleanup operations may be undertaken to remove excess epoxy resin or to otherwise place rotor 10 into final operational condition.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A permanent magnet rotor comprising:
   an electrically conductive, non-magnetic housing including an annular front plate and an annular back plate, and defining a central, rotor axis;
   an inner ring secured within the housing between the front and back plates and annularly extending around the rotor axis;
   a plurality of permanent magnets supported within the housing and circumferentially spaced around the inner ring;
   an outer ring secured within the housing between the front and back plates and circumferentially extending around the permanent magnets, and including a plurality of outer ring segments;
   wherein the front and back plates, the permanent magnets, and the outer ring define a plurality of pockets;
   electrically non-conductive filler material filling each of the pockets;
   a plurality of electrically conductive, non-magnetic damper plates located radially outward of the filler material, engaging the front and back plates, and engaging and extending between adjacent outer ring segments; and means securing the damper plates within the housing and including:

a plurality of front rivets, each front rivet being integral with one of said damper plates, extending forward therefrom, through the front plate and including a front head portion located forward of and overlaying a portion of the front plate, and a plurality of back rivets, each back rivet being integral with one of said damper plates, extending rearward therefrom, through the back plate and including a back head portion located rearward of and overlaying a portion of the back plate.

2. A permanent magnet rotor comprising:

an electrically conductive, non-magnetic housing including an annular front plate and an annular back plate, and defining a central, rotor axis;

an inner ring secured within the housing between the front and back plates and annularly extending around the rotor axis;

a plurality of permanent magnets supported within the housing and circumferentially spaced around the inner ring;

an outer ring secured within the housing between the front and back plates and circumferentially extending around the permanent magnets, and including a plurality of outer ring segments;

wherein the front and back plates, the permanent magnets, and the outer ring define a plurality of pockets;

electrically non-conductive filler material filling each of the pockets;

a plurality of electrically conductive, non-magnetic damper plates located radially outward of the filler material, engaging the front and back plates, and engaging and extending between adjacent outer ring segments;

means securing the damper plates within the housing and including;

a plurality of front rivets, each front rivet extending forward from and being integral with one of said damper plates, extending through the front plate and including a front head portion located forward of and overlaying a portion of the front plate, and a plurality of back rivets, each back rivet extending rearward from and being integral with one of said damper plates, extending through the back plate and including a back head portion located rearward of and overlaying a portion of the back plate, and a rotor fan including:

a base secured within the filler material, and a blade connected to the base, located forward of the front plate, extending radially therealong, and defining a recess receiving the head portion of a front rivet.

3. A permanent magnet rotor comprising:

a housing including an annular front plate and an annular back plate, and defining a central, axial shaft opening, and a plurality of symetrically, circumferentially spaced axially extending bolt openings radially spaced from the shaft opening;

an inner ring secured within the housing, between the front and back plates, annularly extending around the shaft opening, and defining a plurality of axially extending, through bores aligned with the respective bolt openings;

each of the through bores having a first portion and a second portion with the second portion being of a larger diameter than the first portion such that a shoulder is formed between the first and second portions, the first portion extends between the shoulder and the front plate and the second portion extends between the shoulder and the back plate;

a plurality of jam nuts embedded within each of the second portions of the through bores in the inner ring, between the shoulders and the back plate of the housing, and defining threaded openings aligned with the through bores whereby threaded engagement with the jam nuts produces relative displacement of the rotor.

* * * * *